United States Patent [19]
Robert

[11] Patent Number: 6,145,719
[45] Date of Patent: Nov. 14, 2000

[54] VEHICLE MOUNTABLE GUN AND EQUIPMENT CASE

[76] Inventor: Louis J. Robert, Rural Route #2, New Liskeard, Ontario, Canada, P0J 1P0

[21] Appl. No.: 09/373,205

[22] Filed: Aug. 12, 1999

[51] Int. Cl.⁷ ........................................................ B60R 9/00
[52] U.S. Cl. ........................... 224/401; 224/319; 224/328; 224/435; 224/913
[58] Field of Search ..................................... 224/400, 401, 224/428, 433, 435, 448, 319, 328, 913, 917.5; 206/317, 811

[56] References Cited

U.S. PATENT DOCUMENTS

| | | |
|---|---|---|
| 2,531,550 | 11/1950 | Bradley et al. .................. 224/913 X |
| 3,565,305 | 2/1971 | Belokin, Jr. ...................... 224/319 X |
| 3,848,785 | 11/1974 | Bott .................................. 224/319 |
| 3,945,544 | 3/1976 | Walker et al. ................... 224/435 X |
| 4,084,735 | 4/1978 | Kappas ............................ 224/328 |
| 4,406,387 | 9/1983 | Rasor ............................... 224/328 |
| 4,523,704 | 6/1985 | Washington ..................... 224/328 |
| 5,125,531 | 6/1992 | Wentz .............................. 206/811 X |
| 5,160,075 | 11/1992 | Moscovitch ..................... 224/328 |
| 5,299,722 | 4/1994 | Cheney ............................ 224/913 X |
| 5,415,333 | 5/1995 | Wills ................................ 224/328 |

FOREIGN PATENT DOCUMENTS 1488439  7/1967  France ................................. 224/328

OTHER PUBLICATIONS

Mechanix Illustrated, pp. 88 and 89, Jan. 1973.

Primary Examiner—Gregory M. Vidovich

[57] ABSTRACT

A vehicle mountable gun and equipment case for the safe transportion of guns and equipment. The vehicle mountable gun and equipment case includes an upper cover having a top portion and an upper perimeter wall. The upper perimeter wall extends away from a perimeter of the top portion. Next provided is a lower cover having a bottom portion and a lower perimeter wall. The lower perimeter wall extends outwardly from a perimeter of the bottom portion such that the lower perimeter wall and the bottom portion define a space within the lower cover. The lower cover is hingedly attached to the upper cover. A plurality of clasping means are for releasably securing the upper cover to the lower cover. Also included is an equipment retaining pad having at least one of a shaped cut out. The pad is insertable into the space of sad lower cover. The shaped cut out is for conformably receiving a piece of equipment. A plurality of vehicle attachment means are adapted for attaching the lower cover to a vehicle.

9 Claims, 3 Drawing Sheets

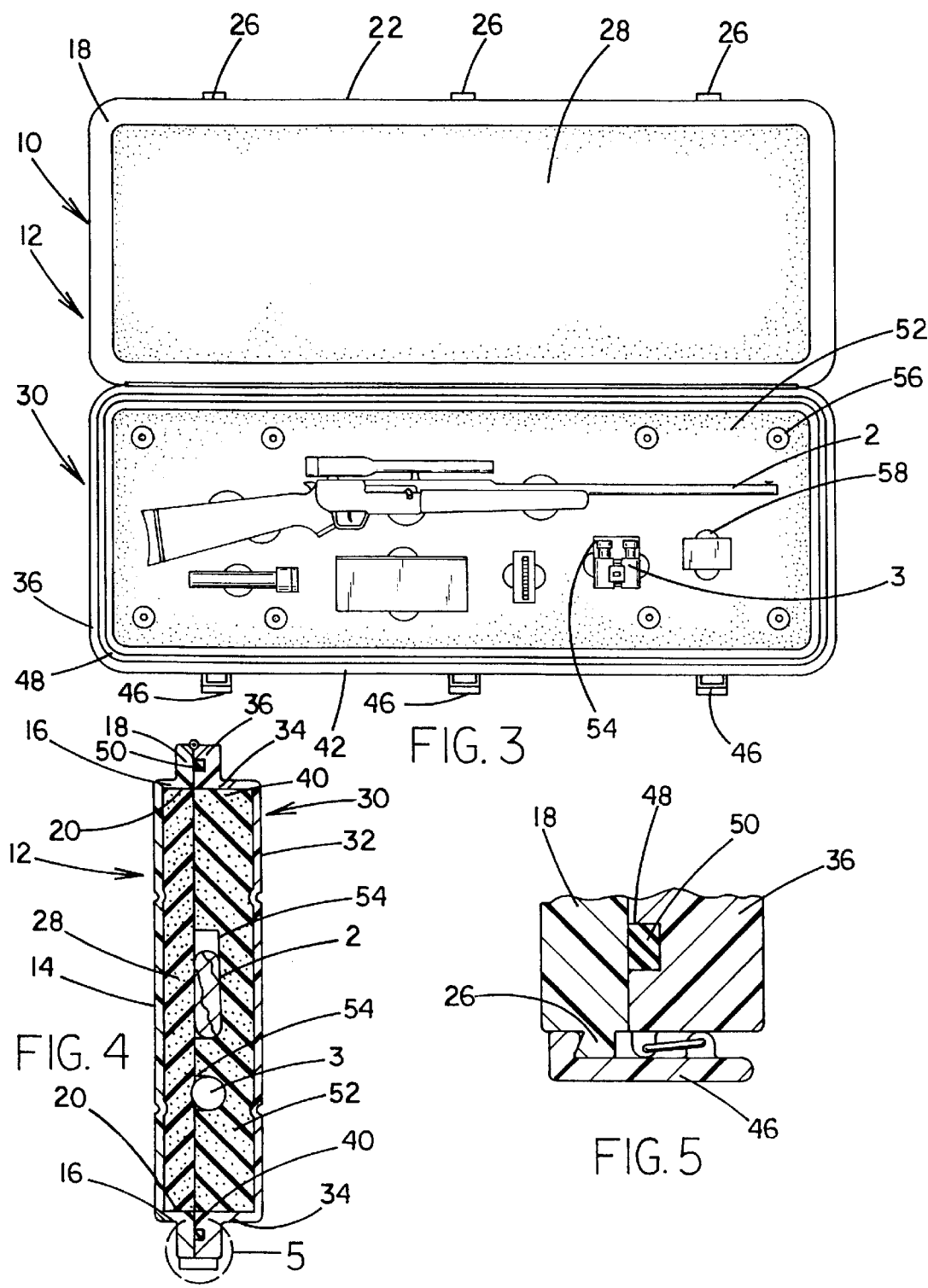

VEHICLE MOUNTABLE GUN AND EQUIPMENT CASE

BACKGROUND OF THE INVENTION

1. Field of the Invention

The present invention relates to gun cases and more particularly pertains to a new vehicle mountable gun and equipment case for the safe transportation of guns and equipment.

2. Description of the Prior Art

The use of gun cases is known in the prior art. More specifically, gun cases heretofore devised and utilized are known to consist basically of familiar, expected and obvious structural configurations, not with standing the myriad of designs encompassed by the crowded prior art which have been developed for the fulfillment of countless objectives and requirements.

Known prior art includes U.S. Pat. No. 4,844,309; U.S. Pat. No. 3,811,562; U.S. Pat. No. Des. 346,143; U.S. Pat. No. 5,573,162; U.S. Pat. No. 4,257,464; and U.S. Pat. No. 3,138,306.

While these devices fulfill their respective, particular objectives and requirements, the afore mentioned patents do not disclose a new vehicle mountable gun and equipment case. The inventive device includes an upper cover having a top portion and an upper perimeter wall. The upper perimeter wall extends away from a perimeter of the top portion. Next provided is a lower cover having a bottom portion and a lower perimeter wall. The lower perimeter wall extends outwardly from a perimeter of the bottom portion such that the lower perimeter wall and the bottom portion define a space within the lower cover. The lower cover is hingedly attached to the upper cover. A plurality of clasping means are for releasably securing the upper cover to the lower cover. Also included is an equipment retaining pad having at least one of a shaped cut out. The pad is insertable into the space of sad lower cover. The shaped cut out is for conformably receiving a piece of equipment. A plurality of vehicle attachment means are adapted for attaching the lower cover to a vehicle.

In these respects, the vehicle mountable gun and equipment case according to the present invention substantially departs from the conventional concepts and designs of the prior art, and in so doing provides an apparatus primarily developed for the purpose of the safe transportation of guns and equipment.

SUMMARY OF THE INVENTION

In view of the foregoing disadvantages inherent in the known types of gun cases now present in the prior art, the present invention provides a new vehicle mountable gun and equipment case construction wherein the same can be utilized for the safe transportation of guns and equipment.

The general purpose of the present invention, which will be described subsequently in greater detail, is to provide a new vehicle mountable gun and equipment case apparatus and method which has many of the advantages of the gun cases mentioned heretofore and many novel features that result in a new vehicle mountable gun and equipment case which is not anticipated, rendered obvious, suggested, or even implied by any of the prior art gun cases, either alone or in any combination thereof.

To attain this, the present invention generally comprises an upper cover having a top portion and an upper perimeter wall. The upper perimeter wall extends away from a perimeter of the top portion. Next provided is a lower cover having a bottom portion and a lower perimeter wall. The lower perimeter wall extends outwardly from a perimeter of the bottom portion such that the lower perimeter wall and the bottom portion define a space within the lower cover. The lower cover is hingedly attached to the upper cover. A plurality of clasping means are provided for releasably securing the upper cover to the lower cover. Also included is an equipment retaining pad having at least one of a shaped cut out. The pad is insertable into the space of sad lower cover. The shaped cut out is for conformably receiving a piece of equipment. A plurality of vehicle attachment means are adapted for attaching the lower cover to a vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle mountable gun and equipment case apparatus and method which has many of the advantages of the gun cases mentioned heretofore and many novel features that result in a new vehicle mountable gun and equipment case which is not anticipated, rendered obvious, suggested, or even implied by any of the prior art gun cases, either alone or in any combination thereof.

It is another object of the present invention to provide a new vehicle mountable gun and equipment case which may be easily and efficiently manufactured and marketed.

It is a further object of the present invention to provide a new vehicle mountable gun and equipment case which is of a durable and reliable construction.

An even further object of the present invention is to provide a new vehicle mountable gun and equipment case which is susceptible of a low cost of manufacture with regard to both materials and labor, and which accordingly is then susceptible of low prices of sale to the consuming public, thereby making such vehicle mountable gun and equipment case economically available to the buying public.

Still yet another object of the present invention is to provide a new vehicle mountable gun and equipment case which provides in the apparatuses and methods of the prior art some of the advantages thereof, while simultaneously overcoming some of the disadvantages normally associated therewith.

Still another object of the present invention is to provide a new vehicle mountable gun and equipment case for the safe transportation of guns and equipment.

Still yet another object of the present invention is to provide a new vehicle mountable gun and equipment case that will provide quick and efficient access guns and equipment case while in the field.

Even still another object of the present invention is to provide a new vehicle mountable gun and equipment case that will protect guns and equipment within the case while being transported on an all terrain vehicle over rough terrain.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a open top plan view of the present invention.

FIG. 4 is a cross-sectional view along line 4—4 of FIG. 2 of the present invention.

FIG. 5 is an enlarged view of the area designated 5 in FIG. 4 of the present invention.

DESCRIPTION OF THE PREFERRED EMBODIMENT

Figure 1:
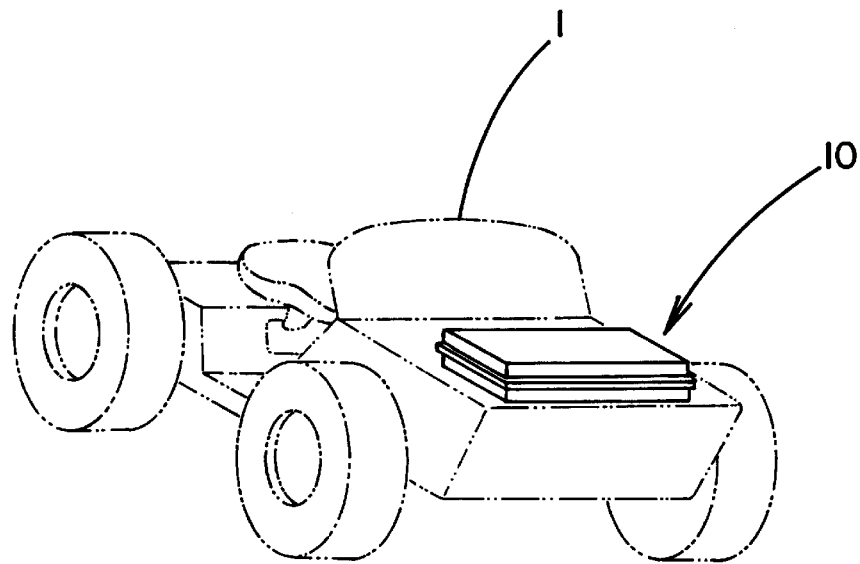
FIG. 1 is an perspective view of a new vehicle mountable gun and equipment case according to the present invention.
Figure 2:
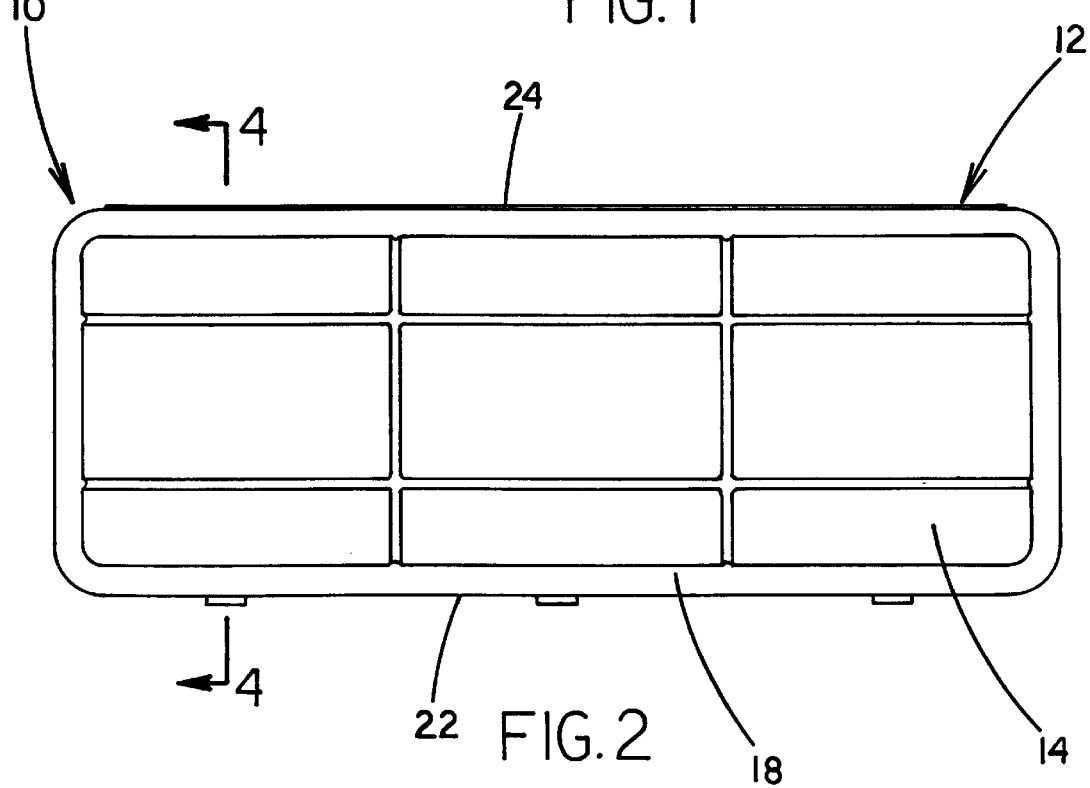
FIG. 2 is a top plan view of the present invention.

With reference now to the drawings, and in particular to FIGS. 1 through 6 thereof, a new vehicle mountable gun and equipment case embodying the principles and concepts of the present invention and generally designated by the reference numeral 10 will be described.

As best illustrated in FIGS. 1 through 7, the vehicle mountable gun and equipment case 10 generally comprises an upper cover 12 having a top portion 14, an upper perimeter wall 16 and an upper lip 18. The upper perimeter wall extends away from a perimeter of the top portion such that the upper perimeter wall and the top portion define a space within the upper cover. The lip extends around a bottom edge 20 of the upper perimeter wall. The lip has a front portion 22 and a rear portion 24. The front portion has a plurality of a top portions of a clasping means 26 deposed thereon. A pad 28 is constructed of an elastomeric material. The pad is disposed in the space of the upper cover portion.

Figure 6:
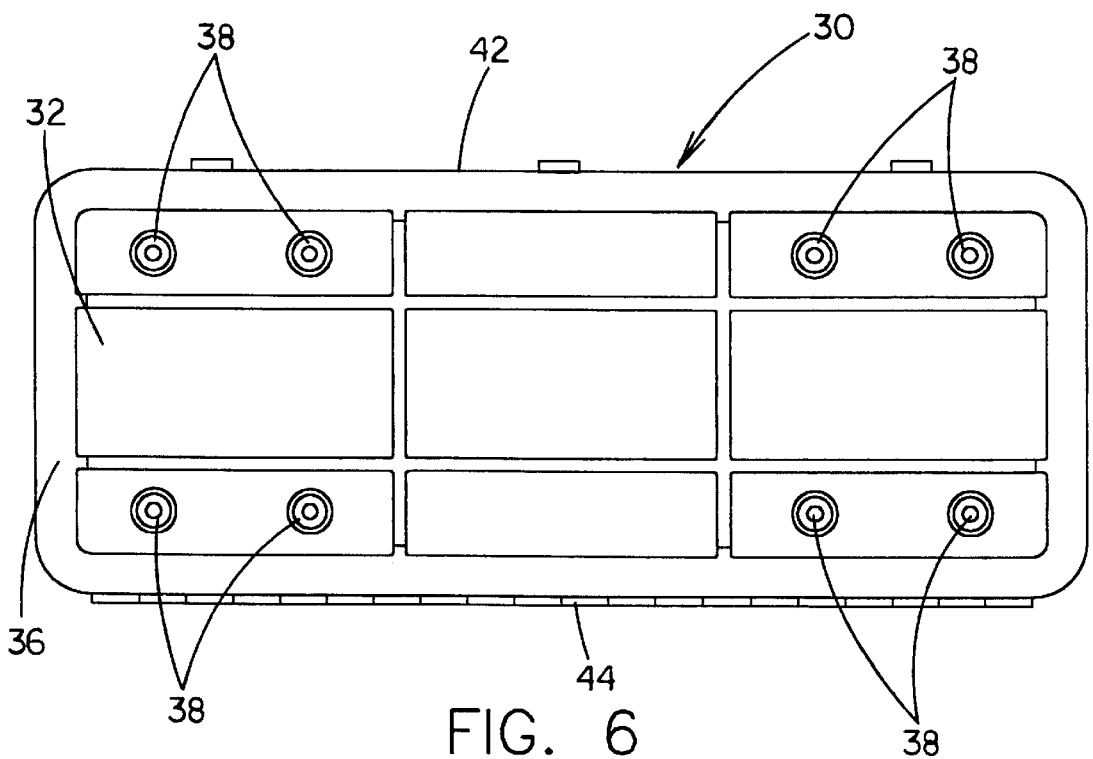
FIG. 6 is a bottom plan view of the present invention.

As shown in FIGS. 4, 5 and 6, a lower cover 30 has a bottom portion 32, a lower perimeter wall 34 and a lower lip 36. The bottom portion has a plurality of bores 38 therethrough. The lower perimeter wall extends outwardly from a perimeter of the bottom portion such that the lower perimeter wall and the bottom portion define a space within the lower cover. The lower lip extends around an upper edge 40 of the lower perimeter wall. The lower lip has a front portion 42 and a rear portion 44. The rear portion of the lower lip is hingedly coupled to the rear portion of the upper lip. The front portion of the lower lip has a plurality of bottom portions of a clasping means 46 such that the lower the bottom portions of the clasping means are releasably couplable to the upper portions of the clasping means. The lower lip has a channel 48 therein. The channel is adapted for receiving an elastomeric seal 50 such that when the upper lip is clasped to the lower lip the elastomeric seal prevents the introduction of fluids or debris into the space of the upper cover and the space of the lower cover.

As show in FIG. 3 an equipment retaining pad 52 has a plurality of shaped cut outs 54 and a plurality of fastener bores 56. The pad is insertable into the space of sad lower cover. The fastener bores are positionable in alignment with the bores of the bottom portion. The shaped cut outs are adapted for conformably receiving a piece of equipment. Each of the shaped cutouts has a plurality of semicircular cutouts 58 extending outwardly from a periphery of the shaped cutouts. The semicircular cutouts facilitate the removal of the equipment from the shaped cut outs.

Figure 7:
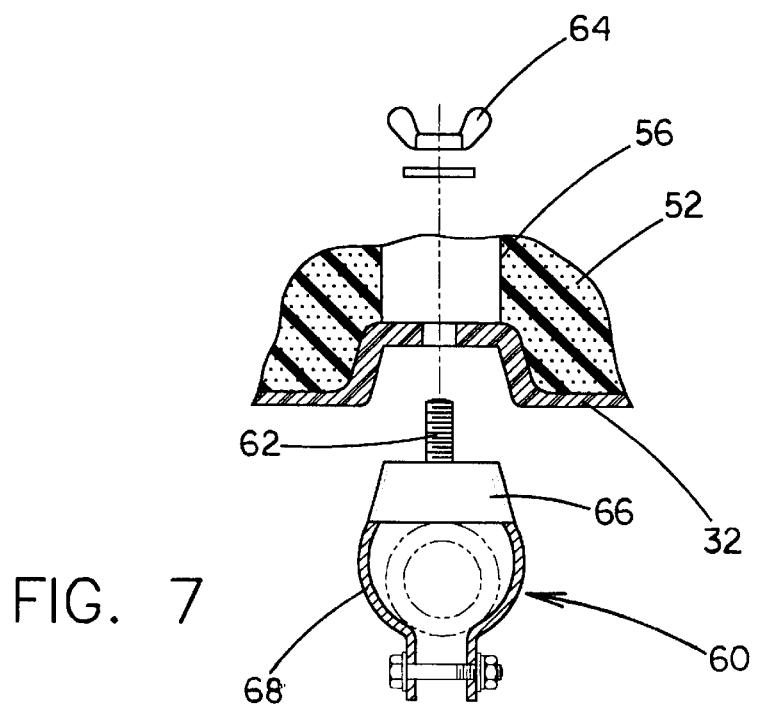
FIG. 7 is an enlarged cross-sectional view of vehicle attachment means and lower cover of the present invention.

FIG. 7 shows a plurality of vehicle attachment means 60 adapted for attaching the lower cover to the equipment carrying area of the all terrain vehicle. Each of vehicle attachment means has a bolt portion 62, a nut portion 64, a frusto conical portion 66 and clamp portion 68. The bolt portion is coupled to the frusto conical portion. The bolt portion extends through the bores of the bottom portion. The nut portion is insertable through the fastener bores of the equipment retaining pad for securing the bolt portion to the bottom portion. The frusto conical portion is adapted for supporting the bottom portion. The clamp portion is coupled to the frusto conical portion opposite the bolt portion. The clamp portion is adapted for engaging the equipment carrying area of the all terrain vehicle.

In use, a user secures the gun and equipment case to a vehicle, such as an all terrain vehicle 1, with the vehicle attachment means. A user is then able to place guns 2 and equipment 3 into the shaped cutouts shaped to conform to that particular gun or piece of equipment. The upper cover would then be closed over the lower cover and the clasping means would then be closed to secure the equipment inside. The user could then transport the equipment to a location as is desired and retrieve the undamaged equipment from the case.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle mountable gun and equipment case for storage of equipment on a vehicle, said gun and equipment case comprising:

an upper cover having a top portion with a perimeter and an upper perimeter wall, said upper perimeter wall extending away from said perimeter of said top portion;

a lower cover having a bottom portion with a perimeter and a lower perimeter wall, said lower perimeter wall extending outwardly from said perimeter of said bottom portion such that said lower perimeter wall and said bottom portion define a space within said lower cover, said lower cover being hingedly attached to said upper cover;

a plurality of clasping means being for releasably securing said upper cover to said lower cover;

an equipment retaining pad having at least one of a shaped cut out, said pad being insertable into said space of said lower cover, said shaped cut out being for conformably receiving a piece of equipment; and a plurality of vehicle attachment means adapted for attaching said lower cover to the vehicle, each of said vehicle attachment means having a bolt portion, a nut portion, a frusto conical portion and a clamp portion, said bolt portion being coupled to said frusto conical portion, said bolt portion being for extending through a respective one of a plurality of bores of said bottom portion, said nut portion being insertable through one of a plurality of fastener bores of said equipment retaining pad for securing said bolt portion to said bottom portion, said frusto conical portion being for supporting said bottom portion, said clamp portion being coupled to said frusto conical portion opposite said bolt portion, said clamp portion adapted for encaging an equipment carrying area of the vehicle.

2. The gun and equipment case as set forth in claim 1 wherein said upper perimeter wall and said top portion define a space within said upper cover.

3. The gun and equipment case as set forth in claim 2 further comprises a pad disposed within said space of said upper cover.

4. The gun and equipment case as set forth in claim 3 wherein said pad of said upper cover is constructed of an elastomeric material.

5. The gun and equipment case as set forth in claim 1 further comprises an upper lip being coupled to a lower edge of the upper perimeter wall of said upper cover, a lower lip being coupled to an upper edge of said lower perimeter wall of said lower cover.

6. The gun and equipment case as set forward in claim 5 wherein each of said clasping means has a first portion and a second portion, said first portion being coupled to said upper lip, said second portion being coupled to said lower lip.

7. The gun and equipment case as set forth in claim 5 wherein said lower lip has a channel therein, said channel being adapted for receiving an elastomeric seal to prevent entrance of fluid or debris when said upper cover is secured to said lower cover.

8. The gun and equipment case as set forth in claim 1 wherein said shaped cutout has at least one semicircular cutout outwardly extending from a periphery of said shaped cutout.

9. A vehicle mountable gun and equipment case for an all terrain vehicle having an equipment carrying area, said gun and equipment case comprising:

an upper cover having a top portion with a perimeter, an upper perimeter wall and an upper lip, said upper perimeter wall extending away from said perimeter of said top portion such that said upper perimeter wall and said top portion define a space within said upper cover, said lip extending around a bottom edge of said upper perimeter wall, said lip having a front portion and a rear portion, said front portion having a plurality of a top portions of a clasping means deposed thereon, a pad being constructed of an elastomeric material, said pad being disposed in said space of said upper cover portion;

a lower cover having a bottom portion with a perimeter, a lower perimeter wall and a lower lip, said bottom portion having a plurality of bores therethrough, said lower perimeter wall extending outwardly from said perimeter of said bottom portion such that said lower perimeter wall and said bottom portion define a space within said lower cover, said lower lip extending around an upper edge of said lower perimeter wall, said lower lip having a front portion and a rear portion, said rear portion of said lower lip being hingedly coupled to said rear portion of said upper lip, said front portion of said lower lip having a plurality of bottom portions of a clasping means such that said bottom portions of said clasping means being releasably couplable to said upper portions of said clasping means, said lower lip having a channel therein, said channel being adapted for receiving an elastomeric seal such that when said upper lip being clasped to said lower lip the elastomeric seal prevents the introduction of fluids or debris into said space of said upper cover and said space of said lower cover;

an equipment retaining pad having a plurality of shaped cut outs and a plurality of fastener bores, said pad being insertable into said space of said lower cover, said fastener bores being positionable in alignment with said bores of said bottom portion, said shaped cut outs being for conformably receiving a piece of equipment, each of said shaped cutouts having a plurality of semicircular cutouts extending outwardly from a periphery of said shaped cutouts, said semicircular cutouts being for facilitating the removal of said equipment from said shaped cut outs; and a plurality of vehicle attachment means adapted for attaching said lower cover to the equipment carrying area of the all terrain vehicle, each of said vehicle attachment means having a bolt portion, a nut portion, a frusto conical portion and clamp portion, said bolt portion being coupled to said frusto conical portion, said bolt portion being for extending through a respective one of said bores of said bottom portion, said nut portion being insertable through said fastener bores of said equipment retaining pad for securing said bolt portion to said bottom portion, said frusto conical portion being for supporting said bottom portion, said clamp portion being coupled to said frusto conical portion opposite said bolt portion, said clamp portion adapted for engaging the equipment carrying area of the all terrain vehicle.

* * * * *